June 18, 1929. W. H. RANKIN 1,718,195
APPARATUS FOR INTRODUCING SUBSTANCES INTO TREES
Filed June 15, 1926
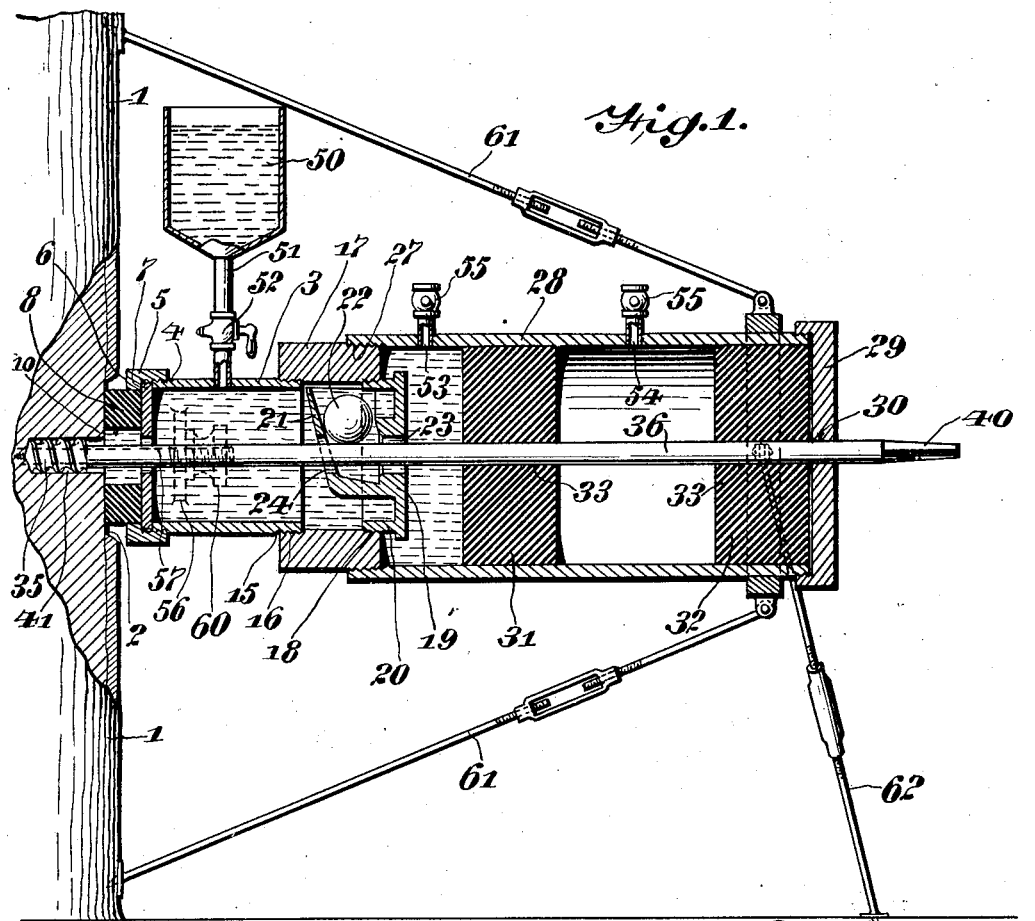
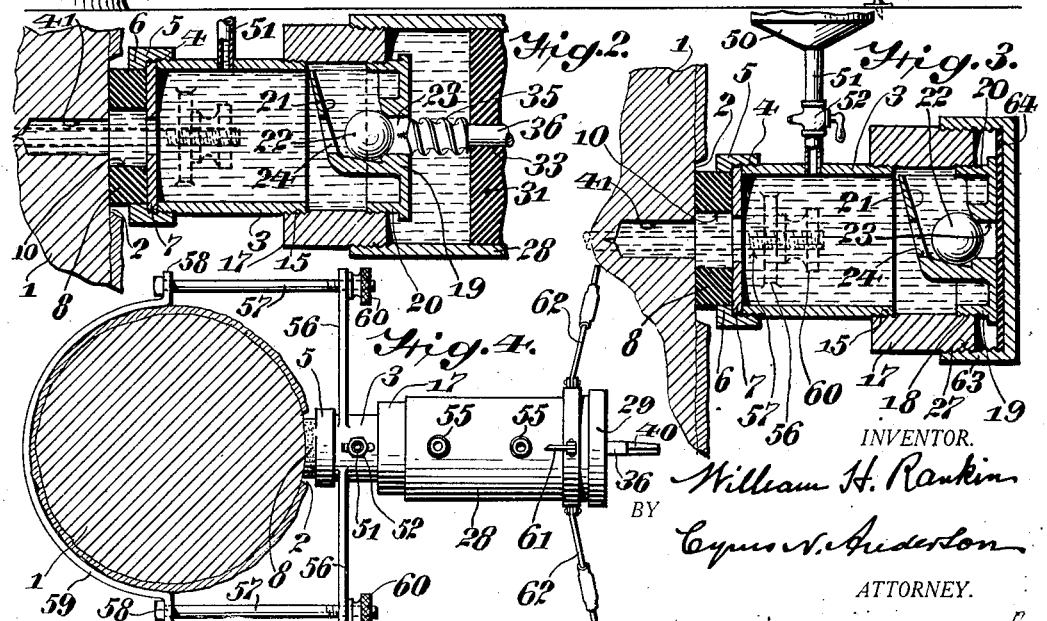

Patented June 18, 1929.

1,718,195

UNITED STATES PATENT OFFICE.

WILLIAM HOWARD RANKIN, OF GENEVA, NEW YORK, ASSIGNOR TO FRANCIS A. BARTLETT, OF STAMFORD, CONNECTICUT.

APPARATUS FOR INTRODUCING SUBSTANCES INTO TREES.

Application filed June 15, 1926. Serial No. 116,158.

For many years it has been known that if substances, particularly fluid substances, were introduced into trees, small or large, shrubs and other plants, at one point, such substances are diffused from the point of introduction to all parts thereof both above and below the point of application. This fact has been taken advantage of for different purposes, namely to effect coloring of the wood, bark, leaves and roots of trees, and also for improving the health of the trees, plants or shrubs, nourishing and feeding the same, immunizing the same against diseases, pests, insects and parasites, and for any other purpose for which it may be found desirable or necessary to inject substances into the body of a tree, shrub or plant.

In the introduction or injection of substances, which usually are in liquid form, into the bodies of trees, plants or shrubs, it has been found to be difficult to prevent air from entering the openings provided for such introduction ahead of the liquid substance. When this happens the air tends to close the pores and passageways in the substance of the tree, shrub or plant, and to retard and delay the proper diffusion and transfer of the substance from the point of introduction to other parts of the tree, shrub or plant to which the substance has been supplied. The diffusion of the substance or the transmission of the same from the point of introduction into the tree to other parts of the tree is facilitated by the fact that the gas pressure within the body of the tree, shrub or plant, is often of negative tension; that is, somewhat below normal atmospheric pressure. The result of this is that when an opening is provided in a tree or the like air rushes in ahead of the substance which is to be introduced unless some means is provided to prevent such action. The air fills the pores and passageways through the body of the tree or other plant to form pockets or stoppages which prevent the ready transference or movement of the substance from its point of introduction to other parts of the tree structure.

The present invention is designed particularly for use in the introduction of liquid substances into trees and it has for its general object to provide a novel construction of means for forming a hole in a tree and for sealing the said hole against the air and simultaneously introducing a liquid or other fluid thereinto.

It also is an object of the invention to provide means which is adapted to be mounted upon the side of a tree and held in position with one end pressed firmly against the tree while a hole is being formed in the tree by means of a boring instrument constituting a part of the said means.

A further object of the invention is to provide means of the character indicated having means for connecting the same to the side of a tree and also having means for preventing lateral displacement of the said means during the formation of a hole in the said tree.

To these and other ends the invention comprehends the construction and arrangement of parts as hereinafter described in detail, particularly pointed out in the claims and as illustrated in the accompanying drawing in which I have shown one form of embodiment thereof. However, it will be understood that the invention is susceptible of other embodiments than that shown and that changes in the details of construction may be made within the scope of the claims without departing from the invention.

In the drawing:

Fig. 1 is a view in elevation of a portion of a tree upon which the means embodying my invention is mounted the latter being shown in longitudinal central section;

Fig. 2 is a similar view showing a fragmentary portion of said means with certain portions of the mechanism in different positions from those in which they are shown in Fig. 1;

Fig. 3 is a similar view of a portion of the said means the outer portion of which is shown in Fig. 1 as having been removed and a cover applied to an inner portion thereof to retain therein a liquid; and Fig. 4 is a view showing the said means in top plan mounted upon a side of a tree, the said tree being shown in horizontal transverse section.

Referring to the drawing, it will be noted that a portion of the bark upon one side of a tree 1 is cut away, as indicated at 2, in order to form a smooth bearing surface for the inner end of the means embodying the invention. The said means comprises a receptacle or tank 3 the inner end of which is screw threaded as indicated at 4 for the reception of an annular rim 5 internally screw threaded for engagement with the screw threads 4. The said rim is provided with an inwardly extending annular flange 6 which is adapted to clamp against the outer edge portion of an annular metal plate 7 against which a bearing block 8 of suitable material, such as rubber, is seated and to which it may be connected. The said block projects through the opening formed by the flange 6. The block 8 is provided with an opening 10. The outer end of the receptacle 3 is provided with external screw threads 15 which are engaged by the internal screw threads 16 of a relatively heavy annular member 17. The outer end of the said member 17 is provided with internal screw threads 18 for the reception of a valve supporting member 19 having an annular portion 20 which is in engagement with the screw threads 18. The member 19 is provided with an inwardly and transversely extending portion 21 which forms with other portions of the member 19 a valve chamber for the reception of a ball 22 which operates, when permitted, to close the opening 23 through the outer end of the member 19. The inner end of the opening 23 constitutes a seat for the ball valve 22. The transversely extending portion 21 is provided with an opening 24 in alinement with the opening 23. The relatively heavy annular member 17 is also provided at its outer end with external screw threads 27 upon which is mounted a cylindrical hollow member 28, the latter having screw threaded connection with the screw threads 27, as clearly shown in Fig. 1 of the drawing. The outer end of the cylindrical hollow member 28 is closed by means of a cap 29 having a hole 30 therethrough. Mounted within and extending transversely of the member 28 are blocks 31 and 32 of material suitable for packing, such as rubber or the like, both of which are provided with openings 33 in alinement with the openings 30, 23, 24 and 10 previously referred to.

For the purpose of forming an opening in the side of a tree (large or small), I have provided a bit or auger 35 the shank 36 of which extends outwardly, when the device is in operation, through the openings 10, 24, 23, 33 and 30, as is clearly shown in Fig. 1. The shank or stem 36 fits somewhat closely the holes 30 and 33 so that the boring tool is supported thereby axially of the receptacle 3 and hollow cylinder 28. The shank or stem 36 is provided at its outer end with a portion 40 which is of polygonal shape in cross section which is adapted to be engaged by means suitable for turning the bit or auger 35 to effect the formation of a hole 41 in the side of a tree. The bit or auger 35 may be of a size to produce a hole of the diameter desired.

In the construction as illustrated I have mounted above the receptacle 3 a tank 50 for holding a liquid which may and usually does contain in solution a substance which it is desired to introduce into the body of a tree or the like. The tank 50 is connected to the receptacle by means of the tube 51, the passageway through which is adapted to be controlled by a valve 52. The liquid flows from the tank 50 into the receptacle 3 under the force of gravity and as a result of such force pressure is exerted tending to force the liquid into the opening formed in the side of the tree and to accelerate the absorption thereof by the wood of the body of the tree or plant. Instead of the tank 50, any other suitable means may be employed for supplying a liquid or a gas under pressure to the receptacle 3. Such liquid or gas may be supplied under pressure effected by any suitable mechanical means. If a gas should be supplied, it will be necessary to provide means of suitable character by means of which the gas is adapted to be confined and subjected to pressure and thereby forced into the receptacle 3 and into the opening formed in the side of a tree or plant.

The hollow cylinder 28 is provided with openings 53 and 54 which are controlled by means of check valves 55 which permit the escape of air therethrough from the cylinder 28 but prevent the passage of air into said cylinder. When the bit or auger is in position as shown in Fig. 1 of the drawing with the shank or stem 36 thereof extending through the openings 23 and 24 it will be noted that the ball valve 22 is held out of position to close the opening 23. When the bit or auger is withdrawn so that it does not extend through the openings 23 and 24 the ball 22 is adapted to occupy a position to close the opening 23, as is clearly shown in Fig. 2 of the drawing. For the purpose of mounting the device upon the side of a tree I have provided the receptacle 3 with laterally extending arms 56 the outer ends of which are provided with openings through which the outer ends of tightening or clamping rods 57 extend. These clamping rods extend through openings in ears 58 at the opposite ends of a semi-circular clamping band 59 which is adapted to engage the bole or body of a tree in opposite relation to the region of contact of the block 8 with the said tree. The inner or forward ends of the clamping or tightening bolts 57 are provided with heads which engage the ears 58 for the purpose of clamping the bearing block 8 against the prepared or smoothed portion of the body of the tree. Nuts 60 upon the outer ends of the bolts 57 are screwed against the outer sides of the end portions of the arms 56. It is apparent that upon the tightening of these nuts 60 the receptacle 3 and the parts carried thereby and the clamping band 59 are drawn toward each other so as to clamp against the tree whereby the device is mounted and held thereon.

In order to prevent lateral movement of the outer end portion of the device during the operation of rotating the bit or auger to form the hole 41 braces 61 and 62 are provided. These braces have pivotal connection at their inner ends to the outer end portion of the hollow cylinder 28. The points of connection of the braces 61 to the said cylinder are one hundred and eighty degrees apart and occupy a vertical plane when the device is mounted upon the side of the body of a tree. The points of connection of the braces 62 to the said hollow cylinder 28 are also located approximately one hundred and eighty degrees apart and in a horizontal plane when the said device is mounted upon the side of a tree and provided the said device extends from the said tree in a horizontal direction. The outer swinging ends of the braces 61 are adapted to engage the tree at points above and below the point of contact of the block 8 with the tree while the braces 62 are adapted to engage the ground upon opposite sides of the device, as is indicated in the drawing.

When it is desired to introduce a substance dissolved in a liquid the device is mounted upon the side of a tree in the manner as indicated in the drawing. The auger is inserted into or through the receptacle 3 but is not operated to form a hole in the tree. The required quantity of liquid containing therein a substance which it is desired to introduce into the tree is poured into the tank 50 and flows therefrom through the pipe 51 into the receptacle 3 and from the latter into the space within the hollow cylinder 28 in front of the block 31. The air is displaced by the entry of the liquid into the receptacle 3 and into the forward portion of the hollow cylinder 28 and escapes from the latter through the outlet 53. The receptacle having been filled with liquid the bit or auger is then operated to form the hole 41. Upon the formation of the latter the liquid enters rapidly due to the fact that, as previously herein stated, the gas pressure in the interior of the tree is negative in character; that is to say, is of a pressure somewhat less than that of normal atmospheric pressure. After the hole has been formed and the amount of liquid desired is introduced into the tank 50 and receptacle 3 the bit or auger may be withdrawn so that the inner spiral portion thereof occupies a position within the hollow cylinder 28 in front of the block 31. As the bit or auger is withdrawn to that position the ball 22 drops down into the position shown in Fig. 2 and closes the opening 23 to retain the liquid within the receptacle 3 and the tank 50, assuming that said tank is filled or partially filled with liquid. The bit or auger having been removed to the position as indicated in Fig. 2 the hollow cylinder with the bit or auger mounted thereon may then be unscrewed from the annular member 17 after which a cap or cover 63, having a washer 64 upon its inner side, is mounted upon the said annular member 17 so that the washer 64 is seated tightly against the outer side of the valve member 19 and hermetically seals the opening 23. The receptacle 3 with the tank 50 mounted thereon and with its outer end closed by means of the cap and washer 63 and 64 is left in position upon the tree until all of the liquid which may be supplied to or which may or will be absorbed by the tree has been absorbed by the latter. Thereafter the nuts 60 upon the outer ends of the clamping rods or bolts 57 are removed, after which the device may be removed and transferred to another tree for use. In the meantime, however, the hollow cylinder 28 with the bit or auger mounted thereon may have been employed for many other operations in connection with other receptacles like the receptacle 3 shown in the drawing.

It is quite apparent that by means of a device such as that disclosed herein embodying my invention it is entirely practical to form a hole in a tree and introduce thereinto a liquid without the possibility of air preceding such liquid into the said hole. Of course, if for any reason it should be desired to introduce into a tree a gas of any kind such gas may be supplied by suitable means into a receptacle 3 of suitable construction and the operation proceeded with in exactly the same manner as has been described herein.

It will be seen that by my invention I have provided means of novel construction by which the operation of introducing fluids into trees, large or small, is greatly facilitated and by which also the introduction of substances in liquid form into the bodies of trees is rendered practical and economical.

Having thus described my invention, what I claim and desire to secure by Letters Patent is:

1. In means of the character described, the combination of a receptacle adapted to contain a fluid which fluid is adapted to be supplied to a hole in a tree, means associated with the said receptacle for producing a hole in the said tree, the said means extending through any fluid which may occupy the said receptacle, means mounted within said receptacle for supporting said hole producing means, and means separate from said last named means and mounted upon the said receptacle for preventing the entry of air thereinto during the operation of the said means.

2. In means of the character described, the combination of a receptacle adapted to receive and to hold a liquid, a liquid holding tank mounted upon and rigidly connected with said receptacle and having communication therewith, means associated with the said receptacle for forming a hole in the side of a tree upon which the said means is mounted, means mounted within said receptacle for supporting said hole producing means, means separate from said last named means and mounted upon the said receptacle for preventing the entry of air into the said receptacle during the operation of the said means, and means whereby the said receptacle is adapted to be mounted upon a tree and held thereon.

3. In means of the character described, the combination of a receptacle adapted to receive and hold a liquid which is to be introduced into a tree, a bearing block mounted upon the inner end of said receptacle, means for supporting said receptacle upon a tree with the inner end of the said bearing block in contact with a portion of said tree, the said block being provided with a central opening therethrough, a valve holding member mounted upon the outer end of said receptacle, said member having an opening extending therethrough, a ball valve mounted in the said valve holding member, a boring tool extending through the openings in the said valve holding member and in said block, the said boring tool operating to displace the said ball valve and to open the opening through the said valve holding member, and means for supporting the said receptacle and boring tool upon the side of a tree.

4. In means of the character described, the combination of a receptacle, means for supplying a liquid to said receptacle, a block of relatively soft bearing material mounted upon the inner end of said receptacle which block is adapted to contact with a portion of the said tree and form an air tight joint therewith and is also provided with an opening therethrough, a valve holding member mounted upon the outer end of said receptacle and having an opening extending therethrough, a valve mounted in said valve holding member which is adapted to close said opening, a boring tool adapted to extend through the said openings in the valve holding member and in the said bearing block for forming holes in the sides of trees, and means mounted upon the said receptacle for supporting said boring tool.

5. In means of the character described, the combination of a boring tool, a support therefor comprising a chamber having an opening in its outer end through which the said tool extends, and the said support having at its inner end a bearing block having a central opening therethrough, the inner surface of said bearing block being adapted to contact with the portion of a tree surrounding the point of application of the said boring tool thereto, means for preventing the entry of air into the said hole when the same is formed, and means for closing the opening in the outer end of said chamber upon withdrawal of the said tool therefrom.

6. In means of the character described, the combination of a boring tool, a support therefor comprising inner and outer receptacles having detachable connection with each other, the said receptacles being in axial alinement and having openings therethrough within which the said boring tool is mounted, a valve supporting member mounted upon the outer end of the inner receptacle, a valve adapted to close the opening through said valve supporting member, means for supplying liquid to the said inner receptacle and to a portion of the outer receptacle, and the said valve being adapted to close upon the removal of the said boring tool from the said inner receptacle.

7. In means of the character described, the combination of a boring tool, a support therefor comprising inner and outer receptacles the outer ends of which are closed, which ends are provided with openings extending therethrough within which the said boring tool is mounted, a valve casing mounted upon the closure for the outer end of the inner receptacle, a valve mounted within said casing which is adapted to control the opening through the outer end of the said inner receptacle, means for supplying a liquid to the said inner receptacle, and means for preventing lateral displacement of the said boring tool support upon the operation of the said boring tool.

8. In means of the character described, the combination of a boring tool, inner and outer receptacles having detachable connection with each other and the outer end of each receptacle being closed, the said closed ends having openings extending therethrough within which the said boring tool is mounted, a valve which is adapted to be opened automatically upon the insertion of a boring tool through the opening in the outer end of the inner receptacle, which valve is adapted to automatically close the said opening upon the removal of the said boring tool, and a cap for attachment to the outer end of the inner receptacle upon the removal of the outer receptacle therefrom.

9. In means of the character described, the combination of a boring tool, inner and outer receptacles which are detachably connected and the outer ends of which are closed, which ends have openings extending therethrough in which the said boring tool is mounted, a valve for controlling the opening through the outer end of the inner receptacle, said valve adapted to be opened automatically by the insertion of a boring tool therethrough and to close automatically upon the removal of said boring tool therefrom, means for effecting a water tight joint between the inner end of the inner receptacle and the side of a tree, and means for supplying a liquid to the said receptacle through which liquid the said boring tool is adapted to extend, substantially as described.

10. Means for introducing liquids into trees comprising, in combination, a receptacle having an opening extending therethrough, means for supporting said receptacle with an end thereof in contact with a tree, a tool adapted to be inserted through said opening for the purpose of forming a hole in said tree, a valve for closing said opening which valve is adapted to be displaced into open position by the said tool, means for supporting said tool and for inclosing the outer end portion of said receptacle when the said tool is inserted through said opening, means for supplying a liquid to said receptacle, and means for permitting escape of the air from said receptacle as it is displaced by the entry of the liquid thereinto.

11. Means for introducing liquids into trees comprising, in combination, a receptacle for holding a liquid, means for supporting said receptacle with the outlet portion thereof in water-tight contact with a tree, a boring tool mounted upon and extending through said receptacle for providing an opening in the said tree within the area of the contact of the said receptacle therewith, a tank for supplying a liquid to the said receptacle, adjustable means for controlling the discharge of liquid from the said tank to the said receptacle, means for permitting the escape of air from the said receptacle as the liquid enters the latter but preventing the entry of air thereinto and means operating automatically for retaining liquid in a portion of the said receptacle upon the withdrawal of the boring tool therefrom.

12. Means for introducing liquids into trees comprising, in combination, a two-part receptacle, which parts are detcahably connected with each other, means for supporting and holding the outer end of one of said parts in water-tight contact with a tree, a boring tool mounted within and extending through the said receptacle for providing an opening in the said tree within the area of the contact of one of the parts of said receptacle therewith, a tank mounted upon the part of said receptacle which is in contact with the said tree, the said tank being adapted to supply a liquid to the said part, means for controlling the flow of liquid from the said tank to the said receptacle, means for permitting the escape of air from the said receptacle as the liquid enters the same from the said tank and means whereby, upon the withdrawal of the said boring tool from the part of the said receptacle which is in contact with the tree, the opening through which it is withdrawn is automatically closed.

13. Means for introducing liquids into trees comprising, in combination, a receptacle including two parts which are detachably connected with each other, means for supporting the outer end of one of said parts in water-tight contact with the side of a tree, the said end having an opening therethrough through which a liquid is adapted to be discharged from the said receptacle into the said tree and the opposite end of the said part being provided with an opening through which a boring tool for providing an opening in the said tree is adapted to extend, means mounted within the other part of the said receptacle for rotatively and slidingly supporting said boring tool, means for supplying liquid to the first named part of the said receptacle, means having connection with the other part of said receptacle for permitting air to escape from the said receptacle as it is displaced by the entry of liquid thereto, and means whereby, upon the withdrawal of the boring tool from the first named part of the receptacle, the opening through which it is withdrawn is closed.

In testimony that I claim the foregoing as my invention I have hereunto signed my name this 5th day of June, A. D. 1926.

WILLIAM HOWARD RANKIN.